US012678971B2

(12) United States Patent  
Shin

(10) Patent No.: US 12,678,971 B2  
(45) Date of Patent: Jul. 14, 2026

(54) SYSTEM AND METHOD FOR TRANSFERRING SUBSTRATE

(71) Applicant: SEMES CO., LTD., Cheonan-si (KR)

(72) Inventor: Myeong Gyu Shin, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 252 days.

(21) Appl. No.: 18/377,297

(22) Filed: Oct. 5, 2023

(65) Prior Publication Data

US 2024/0139966 A1     May 2, 2024

(30) Foreign Application Priority Data

Oct. 26, 2022     (KR) ......................... 10-2022-0139532

(51) Int. Cl.  
B25J 11/00          (2006.01)  
B25J 15/00          (2006.01)

(52) U.S. Cl.  
CPC ....... B25J 11/0095 (2013.01); B25J 15/0004 (2013.01)

(58) Field of Classification Search  
CPC .... B25J 11/0095; B25J 11/00; B25J 15/0004; B25J 15/0014; B25J 15/0028; H01L 21/67742; H01L 21/67766; H01L 21/677; H01L 21/67706; H01L 21/67745; H01L 21/687; H01L 21/67718; H01L 21/68; H01L 21/68707; B65G 47/244; B65G 49/067  
USPC ............. 700/250, 253; 156/345.24; 382/151; 348/95; 294/213; 901/30  
See application file for complete search history.

(56) References Cited

U.S. PATENT DOCUMENTS

| | | | | |
|---|---|---|---|---|
| 6,960,057 B1* | 11/2005 | Hofmeister | ....... | H01L 21/67766 |
| 7,845,897 B2* | 12/2010 | Agou | ............... | H01L 21/67742 |
| 2003/0123971 A1* | 7/2003 | Koyama | ................. | B25J 9/042 |
| 2014/0265392 A1* | 9/2014 | Pergande | ............ | B25J 15/0014 |

(Continued)

FOREIGN PATENT DOCUMENTS

| | | | | |
|---|---|---|---|---|
| JP | 2004063668 A | * | 2/2004 | |
| KR | 100309932 B1 | * | 12/2001 | ............. H01L 21/68 |

(Continued)

OTHER PUBLICATIONS

Machine Translation of JP-2004063668-A1;"Substrate Carrying Device" (Year: 2004).*

(Continued)

*Primary Examiner* — Ellis B. Ramirez

(57) ABSTRACT

The present invention relates to a substrate transfer system and method enabling a direction of a substrate or the order of substrates to be maintained even when the substrate is swing-moved and transferred by a robot transportation device, in particularly, the substrate transfer system may include: a robot transportation device that transfers at least one substrate using at least one swing-movable transport arm; and a compensatory rotation device that is mounted on the transport arm of the robot transportation device and selectively supports the substrate to thus enable compensatory rotation thereof so that, even when the transport arm has a swing motion while the substrate is transferred by the robot transportation device, a direction of the substrate or the order of the substrates can be maintained.

20 Claims, 18 Drawing Sheets

(56) References Cited

U.S. PATENT DOCUMENTS

| | | | |
|---|---|---|---|
| 2017/0173799 A1* | 6/2017 | LoPiccolo | H01L 21/68792 |
| 2020/0024726 A1* | 1/2020 | Moradian | H01L 21/67748 |
| 2020/0310257 A1* | 10/2020 | Yasunobe | G03F 7/70933 |
| 2022/0336260 A1 | 10/2022 | Shindo | |

FOREIGN PATENT DOCUMENTS

| | | |
|---|---|---|
| KR | 10-2005-0013320 | 2/2005 |
| KR | 10-2005-0069532 | 7/2005 |
| KR | 10-2007-0053538 | 5/2007 |
| KR | 10-1004413 | 12/2010 |
| KR | 10-1679058 | 11/2016 |

OTHER PUBLICATIONS

Office Action from the Korean Intellectual Property Office dated Jul. 25, 2024.

* cited by examiner

SYSTEM AND METHOD FOR TRANSFERRING SUBSTRATE

CROSS-REFERENCE TO RELATED PATENT APPLICATION

This application claims the benefit of Korean Patent Application No. 10-2022-0139532, filed on Oct. 26, 2022, in the Korean Intellectual Property Office, the disclosure of which is incorporated herein in its entirety by reference.

BACKGROUND OF THE INVENTION

1. Field of the Invention

The present invention relates to a system and method for transferring a substrate, and more particularly, to a system and method for transferring a substrate, which are capable of maintaining a direction of the substrate or the order of substrates even when the substrates are swing-moved and transported by a robot transportation device.

2. Description of the Related Art

When a robot transportation device transports substrate from an upstream equipment on the left to a downstream equipment on the right, if the substrates are in the order of substrate A and substrate B, an orientation angle of the robot transportation device is altered by 180° while the robot transportation device is being turned and a transport arm is swinging so that the order of the substrates is naturally and necessarily reversed to substrate B and substrate A.

Therefore, according to the conventional art, in order to ensure continuity of the order of substrates between equipments by further reversing such reversed order of substrates as described above into substrate A and substrate B, an additional turning-table device capable of changing the order of substrates or the direction of substrates has been mounted on the upstream equipment or the downstream equipment.

Therefore, according to the conventional art, a substrate transport time of the robot transportation device to transfer the substrate and a substrate-turning time of further reversing the previously reversed substrate by the turning-table device were needed separately, hence requiring a long time for transferring and aligning the substrates. Further, there was a problem of additionally demanding undesired parts or space for installation of a turning-table.

SUMMARY OF THE INVENTION

Therefore, the present invention has been made to overcome different problems including the afore-mentioned problems, and it is an object of the present invention to provide a substrate transfer system in which a compensatory rotation device capable of further reversing the previously reversed substrate is mounted on a robot transportation device so that, even when a substrate is transferred by the robot transportation device, a direction of a substrate or the order of substrates can be maintained; wherein an alternative turning-table device is not desired and thus a space utility of apparatus may be improved; wherein the substrate can undergo compensatory rotation while transferring the substrate at the same time, thereby greatly reducing a distribution and transportation time, as well as a substrate transfer method. However, such an object as described above is only for illustrative purpose and the scope of the present invention is duly not restricted thereby.

In order to achieve the above objects, the substrate transfer system according to the spirit of the present invention may include: a robot transportation device that transfers at least one substrate using at least one swing-movable transport arm; and a compensatory rotation device that is mounted on the transport arm of the robot transportation device and selectively supports the substrate to thus enable compensatory rotation thereof so that, even when the transport arm has a swing motion while the substrate is transferred by the robot transportation device, a direction of the substrate or the order of the substrates can be maintained.

Further, according to the present invention, the compensatory rotation device may include: a rotational swing deck that supports the substrate and is rotatably mounted; a swing deck lifting device that moves up and down the rotational swing deck from a first height lower than the transport arm to a second height higher than the transport arm; and a swing deck rotating device that rotates the rotational swing deck lifted to the second height.

Further, according to the present invention, the rotational swing deck may include: a main body connected to the swing deck lifting device or the swing deck rotating device; an extending part installed to be extendable from the main body; and an extension device to extend the extending part.

Further, according to the present invention, the extending part may be a foldable rotary arm to be folded to and unfolded from the main body.

Further, according to the present invention, the foldable rotary arm may include: a first rotating arm to be unfolded in one direction based on the main body; and a second rotating arm to be unfolded in the other direction based on the main body.

Further, according to the present invention, a first support pin may be formed on the main body to support the substrate at three points or more, a second support pin may be formed on the first rotating arm; and a third support pin may be formed on the second rotating arm.

Further, according to the present invention, a control unit to apply a swing motion control signal to the robot transportation device and to apply a compensatory rotation control signal to the compensatory rotation device may be further included, wherein, when the robot transportation device is in swing motion, the control unit may control a compensatory rotation rate of the compensatory rotation device based on a swing motion rate of the robot transportation device so as to constantly maintain a direction of the substrate, thereby preventing rotational shock applied to the substrate.

Further, according to the present invention, when the robot transportation device is in swing motion, the control unit may enable the compensatory rotation device to reversely rotate the substrate by a first angle if the substrate normally rotates at the first angle by the robot transportation device.

Further, according to the present invention, the compensatory rotation device may include: a roll wheel which is mounted on the transport arm of the robot transportation device, and is in rolling contact with the bottom surface of the substrate; and a wheel rotating device which rotates the roll wheel so that the roll wheel can rotate the substrate in a self-rotational direction of the substrate.

Further, according to the present invention, at least three or more roll wheels may be arranged at equal angles based on the center of the substrate.

Further, according to the present invention, the extending part may be a sliding type forward/backward arm that is stored in and then protrudes from the main body.

Further, according to the present invention, the sliding type forward/backward arm may include: a first forward/backward arm to contract and stretch in one direction based on the main body; and a second forward/backward arm to be contacted and stretched in the other direction based on the main body.

Meanwhile, in order to achieve the above objects, a substrate transfer method according to the spirit of the present invention may include: (a) transferring at least one substrate using at least one swing-movable transport arm by a robot transportation device; and (b) while the substrate is transferred by the robot transportation device, selectively supporting the substrate and enabling compensatory rotation thereof using a compensatory rotation device mounted on the transport arm of the robot transportation device so that, even when the transport arm is in swing motion, a direction of the substrate or the order of the substrates can be maintained.

Further, according to the present invention, the step (b) may include: (b-1) moving the compensatory rotation device upward from a first height lower than the transport arm to a second height higher than the transport arm to thus support the substrate; (b-2) rotating the substrate by the compensatory rotation device; and (b-3) moving the compensatory rotation device downward from the second height higher than the transport arm to the first height lower than the transport arm to thus be spaced from the substrate.

Further, according to the present invention, before the step (b-1), the above step (b) may further include (b-4) extending the extending part from the main body by the compensatory rotation device.

Further, according to the present invention, in the step (b), when the robot transportation device is in swing motion, the compensatory rotation rate of the compensatory rotation device may be controlled based on the swing motion rate of the robot transportation device so as to maintain the direction of the substrate, thereby preventing rotational shock applied to the substrate.

Further, according to the present invention, in the step (b), when the robot transportation device is in swing motion, the compensatory rotation device may reversely rotate the substrate by a first angle if the substrate normally rotates at the first angle by the robot transportation device.

Further, according to the present invention, in the step (b), the compensatory rotation device may rotate the roll wheel in rolling contact with the bottom surface of the substrate to a self-rotational direction of the substrate, thereby enabling compensatory rotation of the substrate.

Further, according to the present invention, the method may further include (c) transferring the compensation-rotated substrate to other apparatus by the robot transportation device while maintaining the direction of the substrate or the order of the substrates.

Meanwhile, in order to achieve the above objects, the substrate transfer system according to the spirit of the present invention may include: a robot transportation device that transfers at least one substrate using at least one swing-movable transport arm; a compensatory rotation device that is mounted on the transport arm of the robot transportation device, and selectively supports the substrate and enables compensatory rotation thereof so that, even when the transport arm is in swing motion while the substrate is transferred by the robot transportation device, a direction of the substrate or the order of the substrates can be maintained; and a control unit that applies a swing motion control signal to the robot transportation device and also a compensatory rotation control signal to the compensatory rotation device, wherein the compensatory rotation device may include: a rotational swing deck that supports the substrate and is rotatably mounted; a swing deck lifting device that moves up and down the rotational swing deck from a first height lower than the transport arm to a second height higher than the transport arm; a swing deck rotating device that rotates the rotational swing deck lifted to the second height; a roll wheel that is mounted on the transport arm of the robot transportation device and is in rolling contact with the bottom surface of the substrate; and a wheel rotating device that rotates the roll wheel so that the roll wheel can rotate the substrate in a self-rotational direction of the substrate, wherein the rotational swing deck may include: a main body connected to the swing deck lifting device or the swing deck rotating device; an extending part mounted to be extendable from the main body; and an extension device to extend the extending part, wherein the extending part is a foldable rotary arm to be folded to and then unfolded from the main body, and the foldable rotary arm may include: a first rotating arm that is unfolded in one direction based on the main body; and a second rotating arm that is unfolded to the other direction based on the main body, wherein a first support pin may be formed to support the substrate at three points or more, a second support pin may be formed on the first rotating arm; and a third support pin may be formed on the second rotating arm, and wherein the control unit may control a compensatory rotation rate of the compensatory rotation device based on a swing motion rate of the robot transportation device so that, when the robot transportation device is in swing motion, the direction of the substrate is constantly maintained to thus prevent rotational shock applied to the substrate.

According to one embodiment of the present invention completed as described above, the robot transportation device is provided with a compensatory rotation device cable of further reversing the previously reversed substrate so that, even when the substrate is transferred by the robot transportation device, a direction of the substrate or the order of the substrates may be maintained; an additional turning-table device is undesired to thus improve a space utility of the apparatus; and a compensatory rotation rate of the compensatory rotation device may be controlled based on a swing motion rate of the robot transportation device to constantly maintain the direction of the substrate during transferring, thereby effectively preventing rotational shock applied to the substrate. Of course, the scope of the present invention is duly not limited to such effects as described above.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, different preferred embodiments of the present invention will be described in detail with reference to the accompanying drawings.

The embodiments of the present invention are provided to more completely describe the present invention to persons having ordinary knowledge in the art to which the present invention pertains ("those skilled in the art"), the following embodiments may be modified into different forms, and the scope of the present invention is duly not restricted to the following embodiments. On the contrary, these embodiments will be provided to further sufficiently and completely prepare the present disclosure and to perfectly inform those skilled in the art with the spirit of the present invention. In addition, a thickness or size of each layer shown in the figures will be exaggerated for convenience and clarity of the explanation.

The terms used in the present disclosure are used for explaining specific embodiments but not for restricting the present invention. As used in the present disclosure, the singular form may also include the plural form unless otherwise an alternative case is indicated in the context. Further, "comprise" and/or "comprising" in the present disclosure will specify the existence of mentioned shapes, numbers, steps, motions, members, elements and/or the group thereof, however, does not exclude the existence and/or addition of one or more other shapes, numbers, motions, members, elements and/or the groups thereof.

Hereinafter, the embodiments of the present invention will be described with reference to the drawings in which ideal embodiments of the present invention are schematically illustrated. With regard to the drawings, for example, modification of the illustrated shapes may be expected on the basis of manufacturing techniques and/or tolerance. Accordingly, the embodiments of the present inventive spirit should not be construed as limitation to specific morphologies in the section illustrated in the specification, for example, should include a change in morphologies caused during manufacturing.

Figure 1:
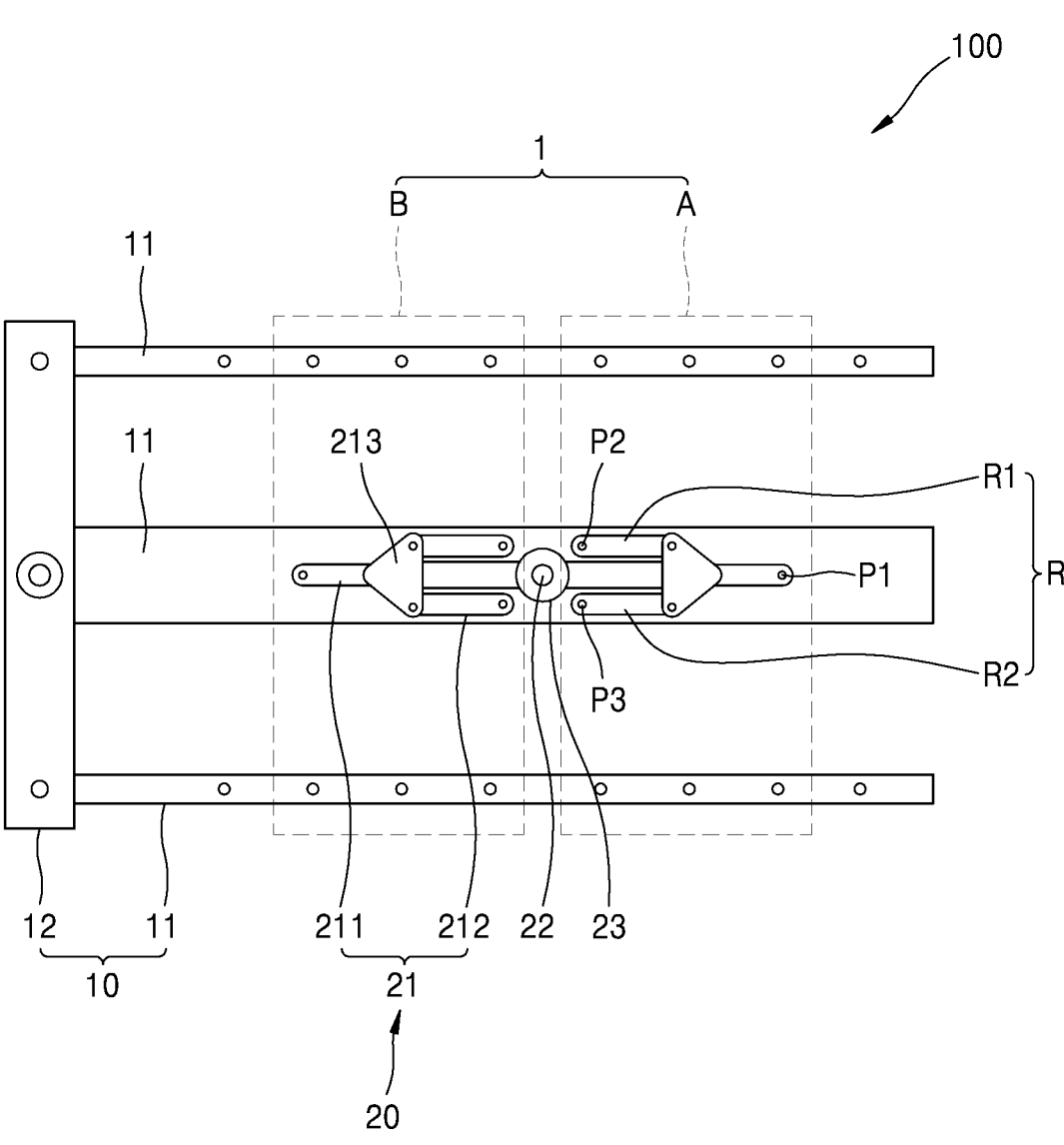
FIG. 1 is a plan view showing a substrate transfer system according to some embodiments of the present invention.

FIG. 1 is a plan view showing the substrate transfer system 100 according to some embodiments of the present invention.

Figure 10:
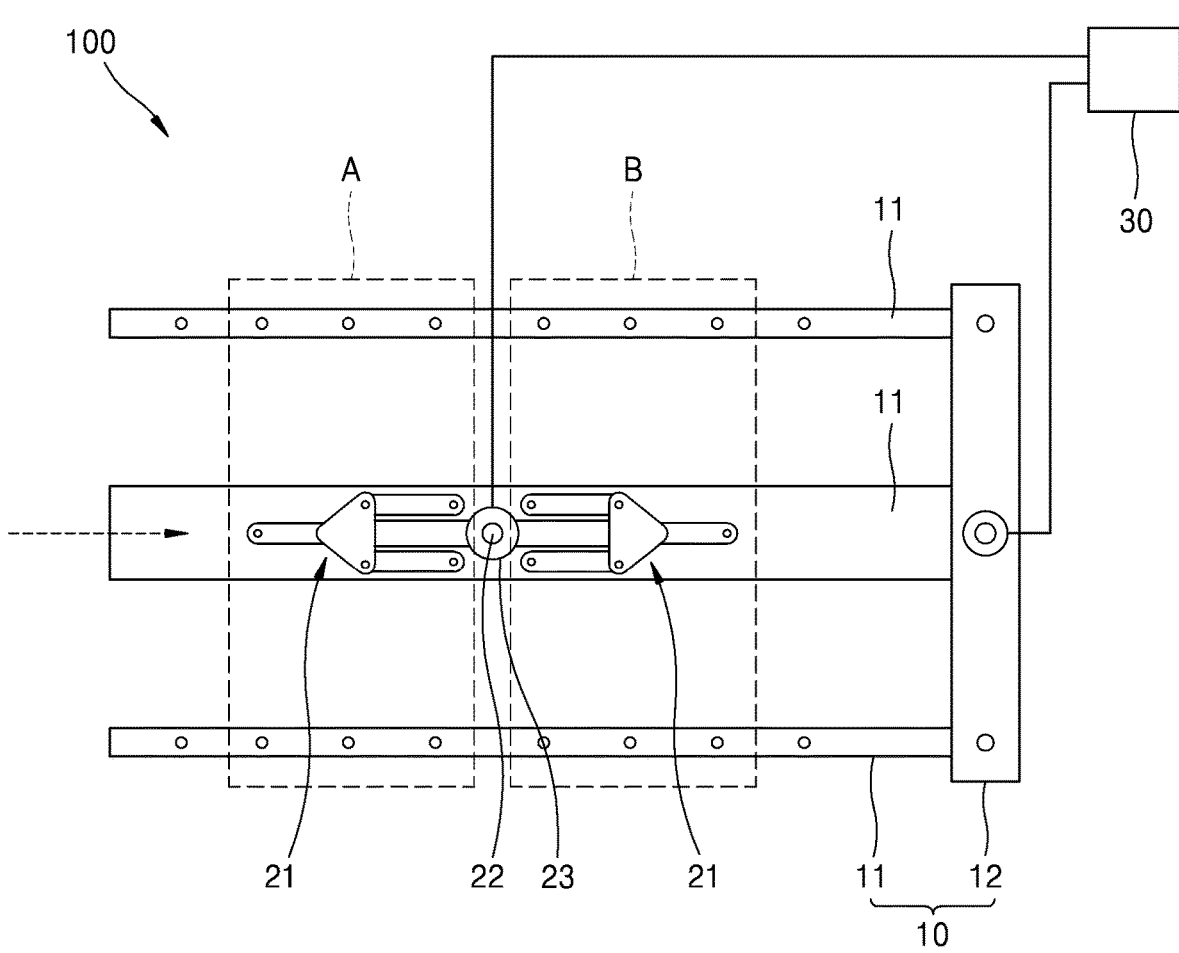
FIGS. 10 to 12 show a process of transferring substrates delivered from the upstream equipment to the downstream equipment by the substrate transfer system shown in FIG. 1 by stages.

First, as illustrated in FIG. 1, the substrate transfer system 100 may generally include a robot transportation device 10, a compensatory rotation device 20 and a control unit 30 (See FIG. 10).

For example, the robot transportation device 10 is a device that may receive at least one substrate 1 from an upstream equipment, swing a rotate by 180° or, after swing rotation by a specific angle, may deliver the substrate to a downstream equipment. Therefore, this device may transfer at least one substrate 1 using at least one swing-movable transport arm 11.

As such, the robot transportation device 10 may be a structure having intensity and durability enough to support the compensatory rotation device 20 installed on the transport arm 11 as well as the substrate 1.

The robot transportation device 10 may include a plurality of transport arms 11 for supporting the substrate 1 and a robot main body 12 to which the transport arms 11 are fixed and in which a rotation axis of the swing rotation is provided.

However, the robot main body 12 is not necessarily limited to that shown in the drawings, instead, diverse shapes of actuators, joints, or links for rotating the rotation axis of swing rotation ("swing rotation axis") may be further provided on the robot main body.

Further, for example, the compensatory rotation device 20 is installed in a central transport arm or a transport arm adjacent the center among the transport arms 11 of the robot transport device 10, and may selectively support the substrate 1 and enable compensatory rotation thereof so that, even when the transport arm 11 is in swing motion while the substrate 1 is transferred by the robot transportation device 10, a direction of the substrate 1 or the order of the substrates 1 can be maintained.

Figure 3:
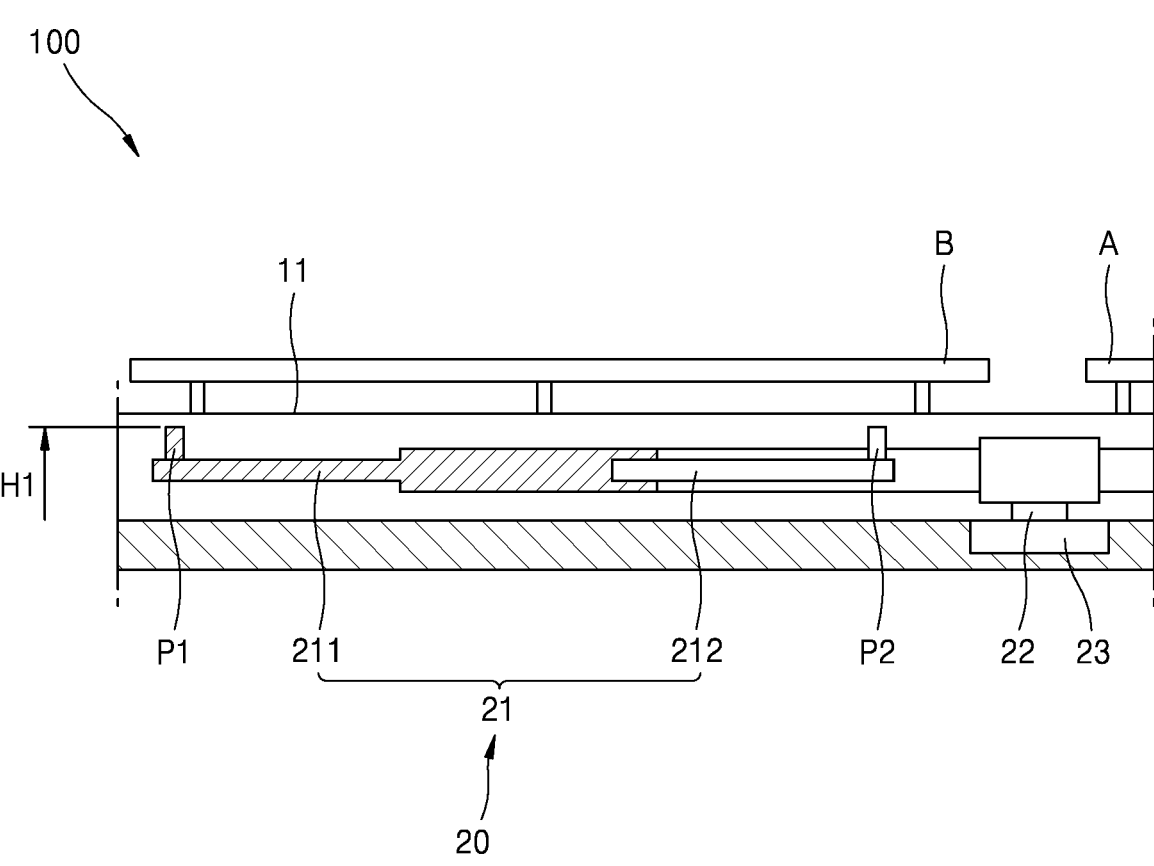

For example, the compensatory rotation device 20 may include: a rotational swing deck 21 that supports the substrate 1 and is rotatably mounted; a swing deck lifting device 22 that moves up and down the rotational swing deck 21 from a first height H1 lower than the transport arm 11 shown in FIG. 3 to a second height H2 (See FIG. 5) higher than the transport arm 11; and a swing deck rotating device 23 that rotates the rotational swing deck 21 lifted to the second height H2.

Herein, as shown in FIG. 1, the rotational swing deck 21 extends from the left side to the right side, and may be formed with a length sufficient to support two or more substrates 1, that is, both of substrate B in the left direction and substrate A in the right direction.

More particularly, for example, the rotational swing deck 21 may include: a main body 211 connected to the swing deck lifting device 22 or the swing deck rotating device 23; an extending part 212 mounted to be extendable from the main body 211; and an extension device 213 to extend the extending part 212.

In this regard, the extending part 212 is a foldable rotary arm R that is folded to and then unfolded from the main body 211, wherein the foldable rotary arm R may include: a first rotating arm R1 unfolded in one direction based on the main body 211; and a second rotating arm R2 unfolded in the other direction based on the main body 211.

Accordingly, a first support pin P1 is formed on the main body 211 to support the substrate 1, a second support pin P2 is formed on the first rotating arm R1, and a third support pin P3 is formed on the second rotating arm R2, so that, when the rotational swing deck 21 is lifted by the swing deck lifting device 22, the substrate 1 can be supported at three points or more.

FIGS. 2 to 9 exhibit an operational process of the substrate transfer system 100 of FIG. 1 by stages.

Figure 2:
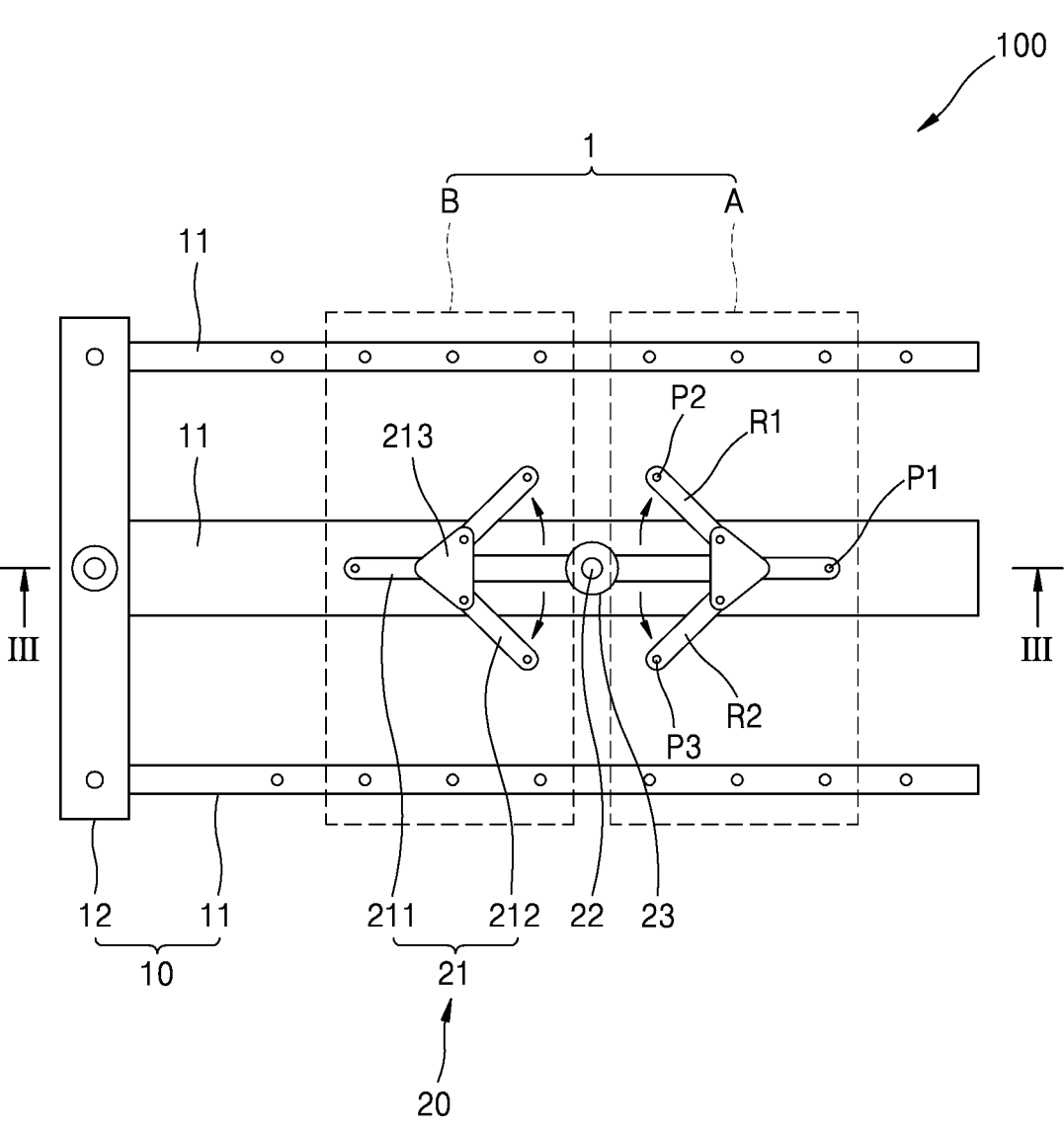
FIGS. 2 to 9 exhibit an operational process of the substrate transfer system shown in FIG. 1 by stages.

As illustrated in FIGS. 2 to 9, the operational process of the substrate transfer system 100 according to some embodiments of the present invention will be described. First, as shown in FIGS. 2 and 3, after loading the substrate 1, the swing deck lifting device 22 moves the rotational swing deck 21 downward to the first height H1 lower than the transport arm 11 as shown in FIG. 3, and then, the extension device 213 may extend and unfold the first rotating arm R1 and the second rotating arm R2.

Figure 4:
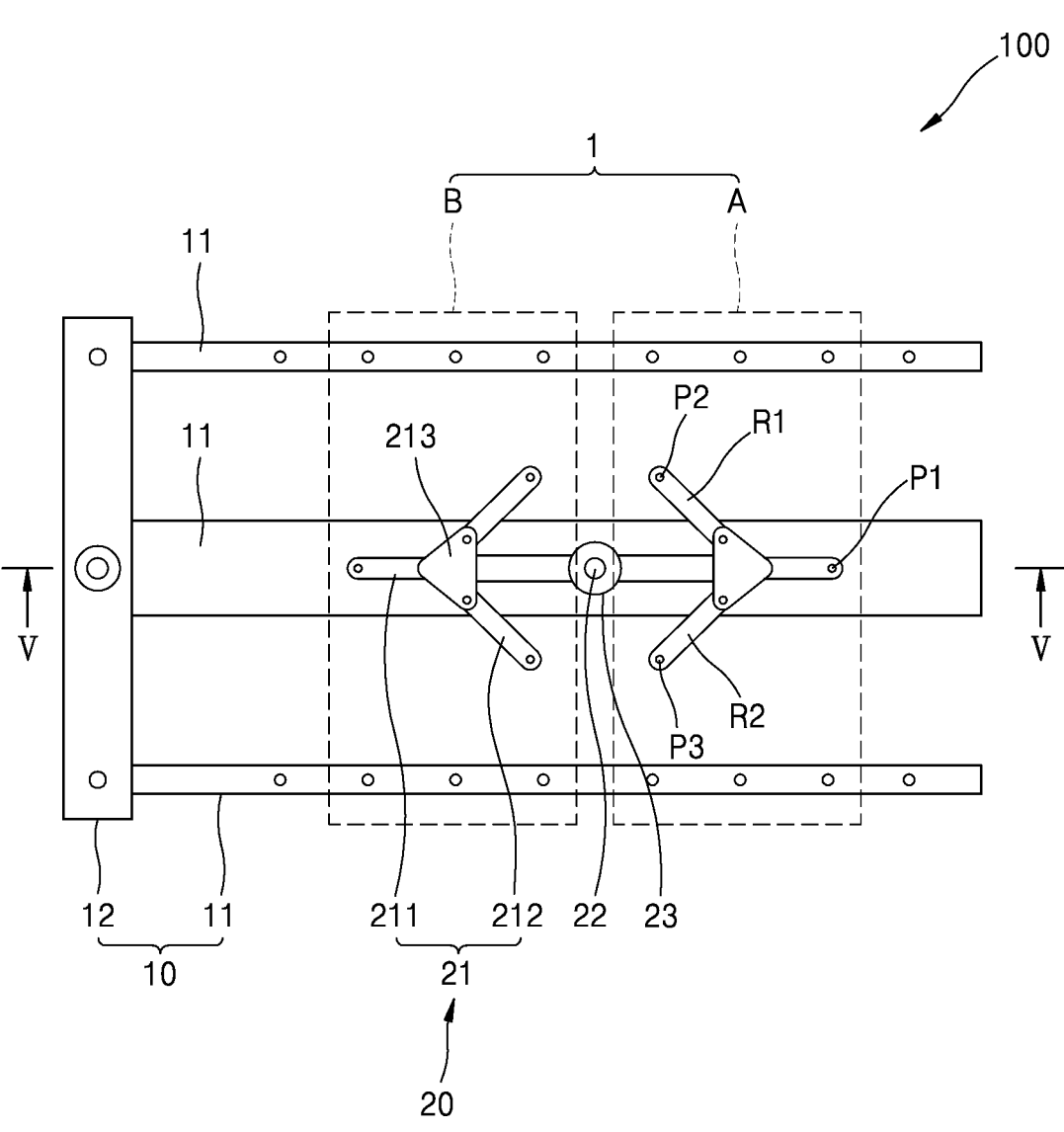
Figure 5:
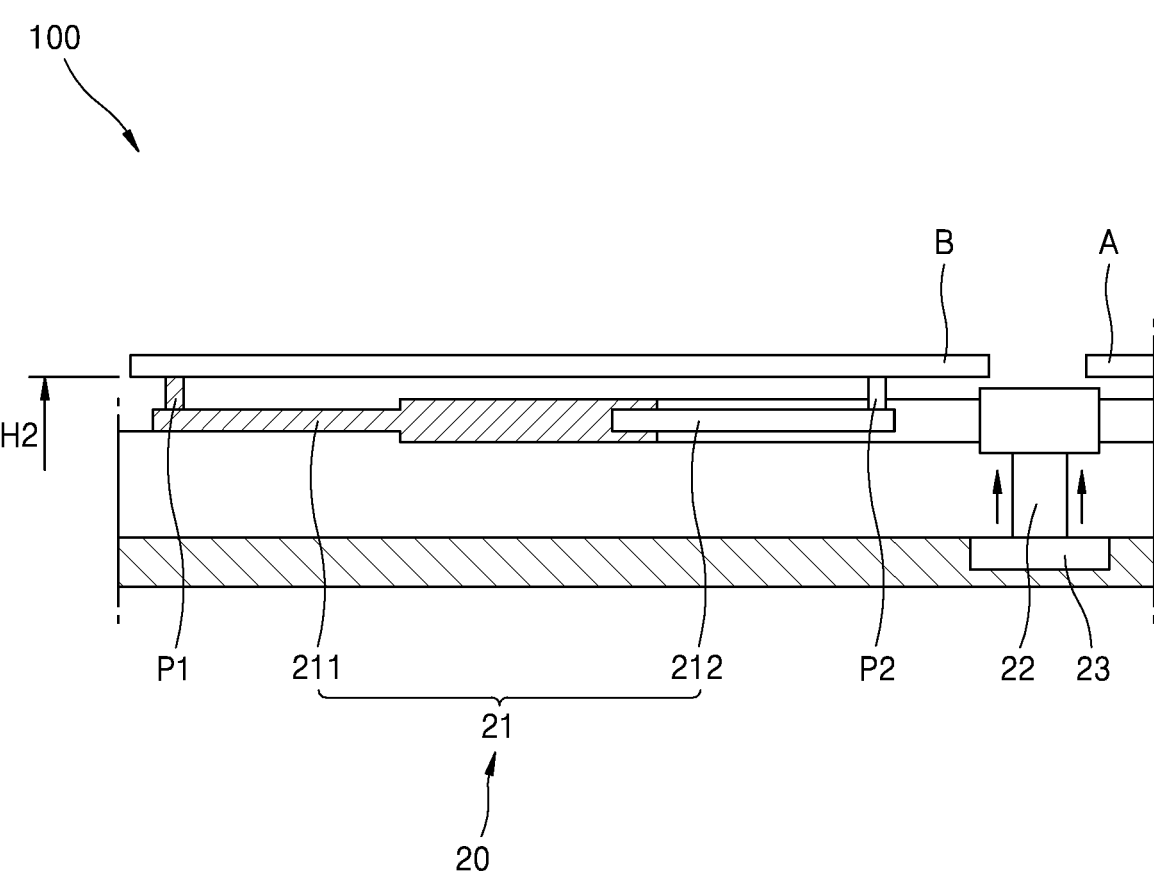

Then, as illustrated in FIGS. 4 and 5, the swing deck lifting device 22 may move the rotational swing deck 21 upward to the second height H2 higher than the transport arm 11, so that the first support pin P1, the second support pin P2 and the third support pin P3 can support the substrate B on the left and the substrate A on the right, respectively, at three points.

Figure 6:
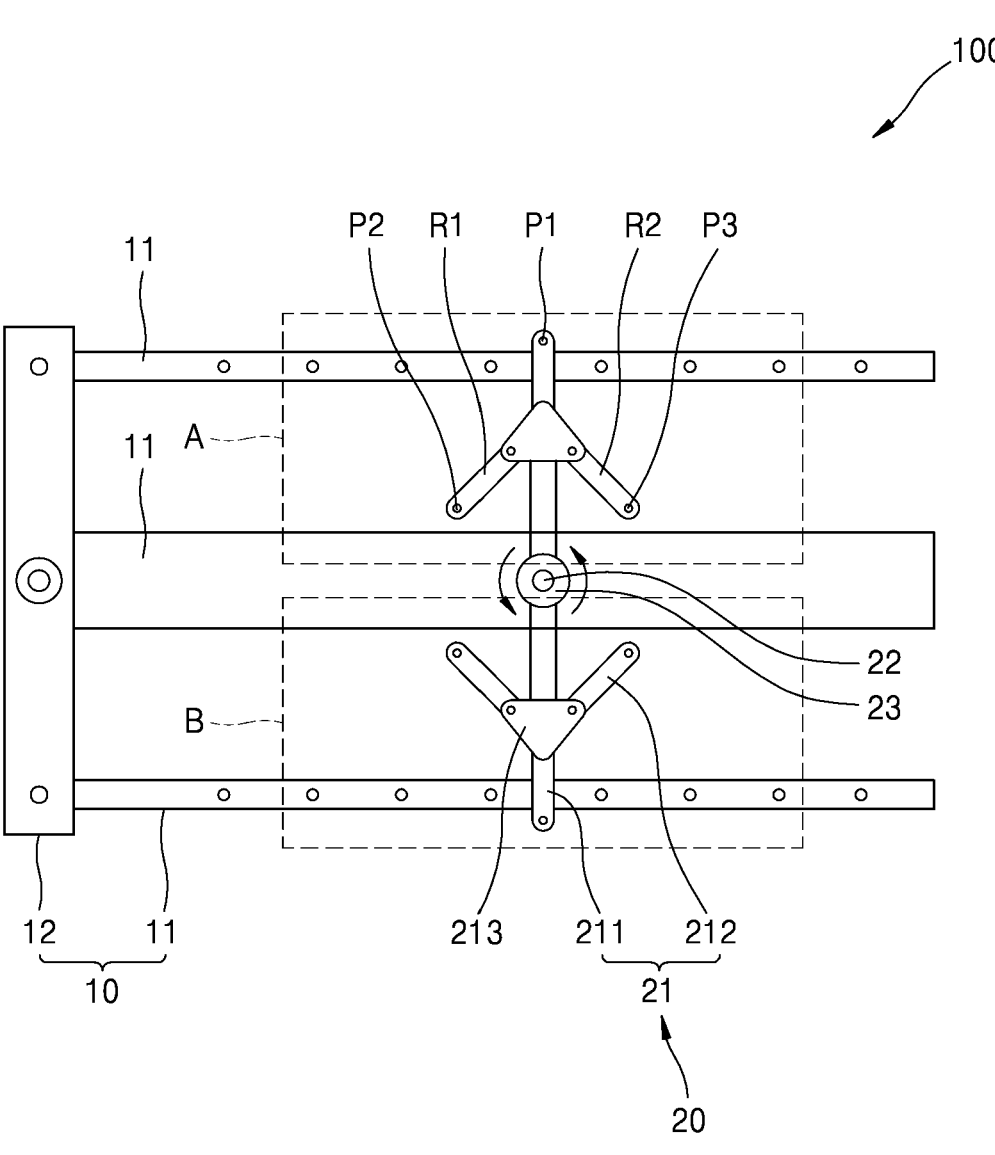

Following this, as shown in FIG. 6, the swing deck rotating device 23 may turn the rotational swing deck 21 by 90° in counter-clockwise direction so as to locate the substrate A in front and the substrate B in the rear.

Figure 7:
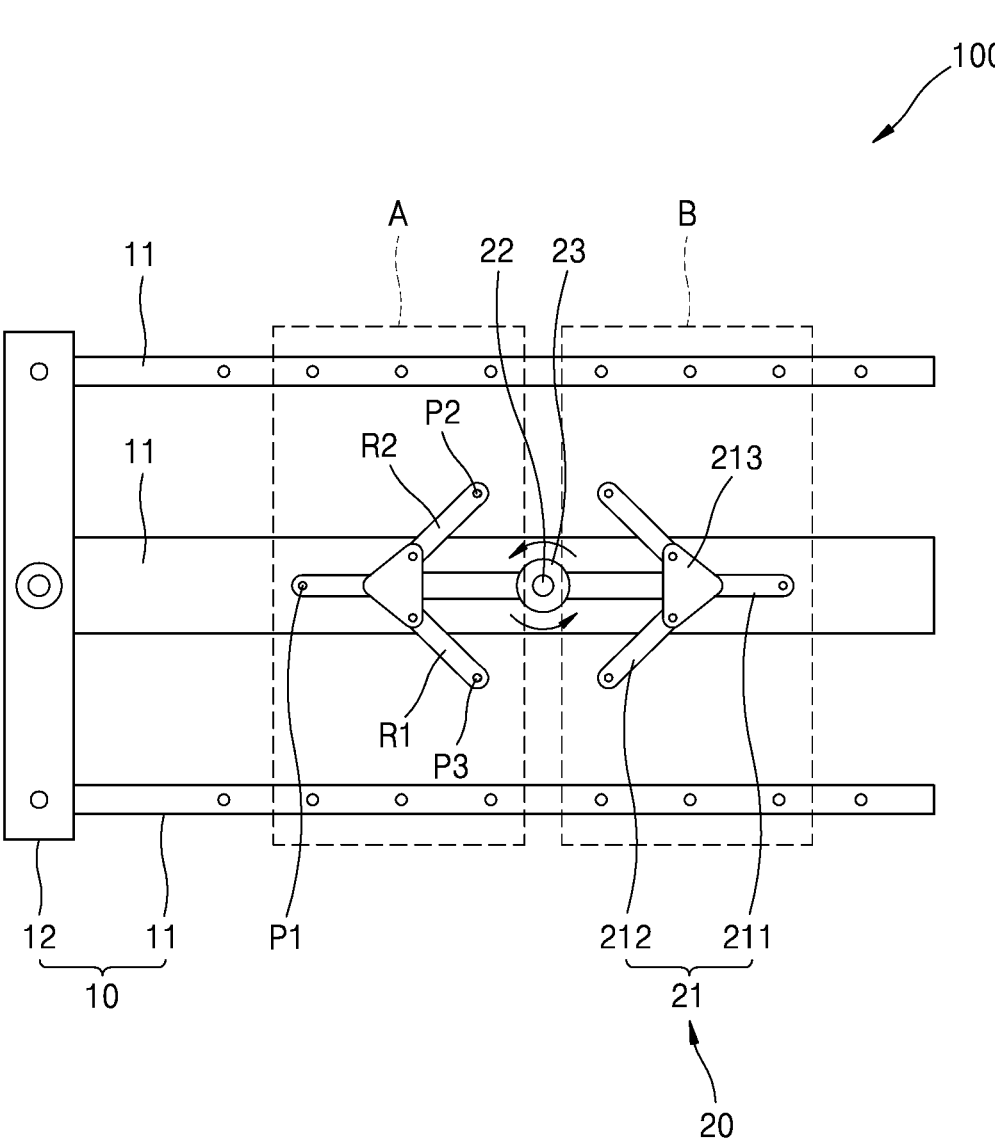

Then, as shown in FIG. 7, the swing deck rotating device 23 may further turn the rotational swing deck 21 by 90° in counter-clockwise direction so as to locate the substrate A on the left and the substrate B on the right.

Figure 8:
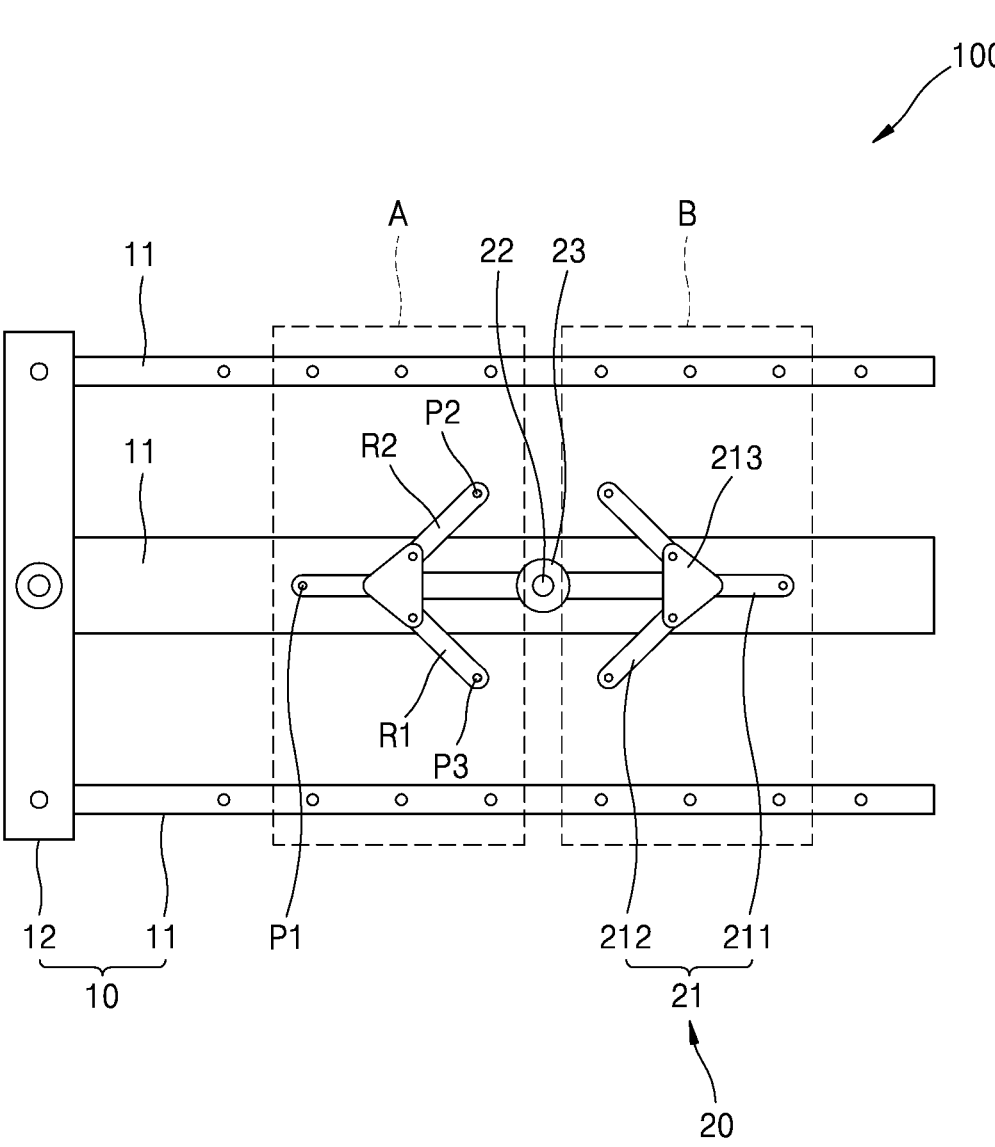

Next, as shown in FIG. 8, the swing deck lifting device 22 may move the rotational swing deck 21 downward to the first height H1 lower than the transport arm 11 so that the rotational swing deck 21 can be spaced from the substrate 1.

Figure 9:
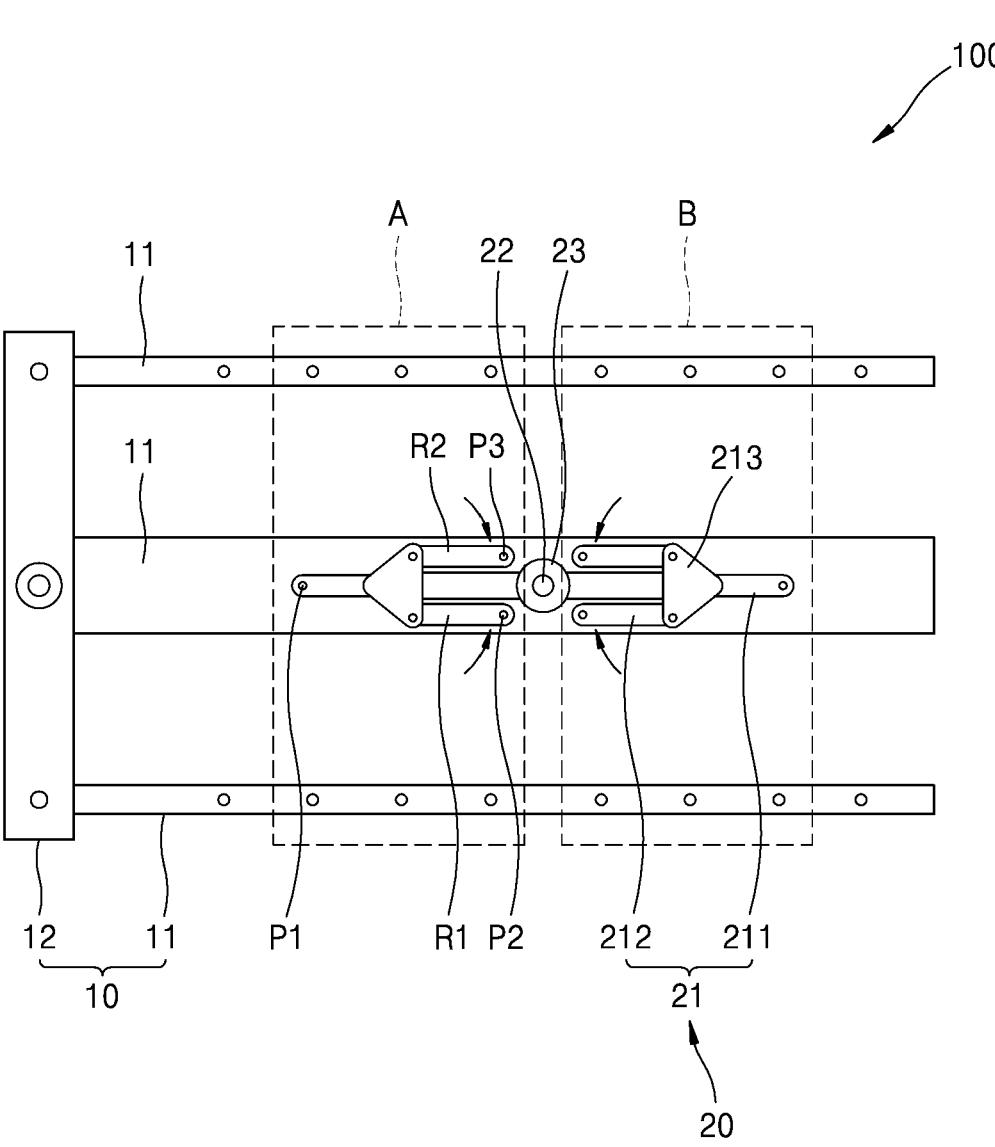

Then, as shown in FIG. 9, the extension device 213 may fold the first rotating arm R1 and the second rotating arm R2 so as to prepare unloading of the substrate 1.

Figure 11:
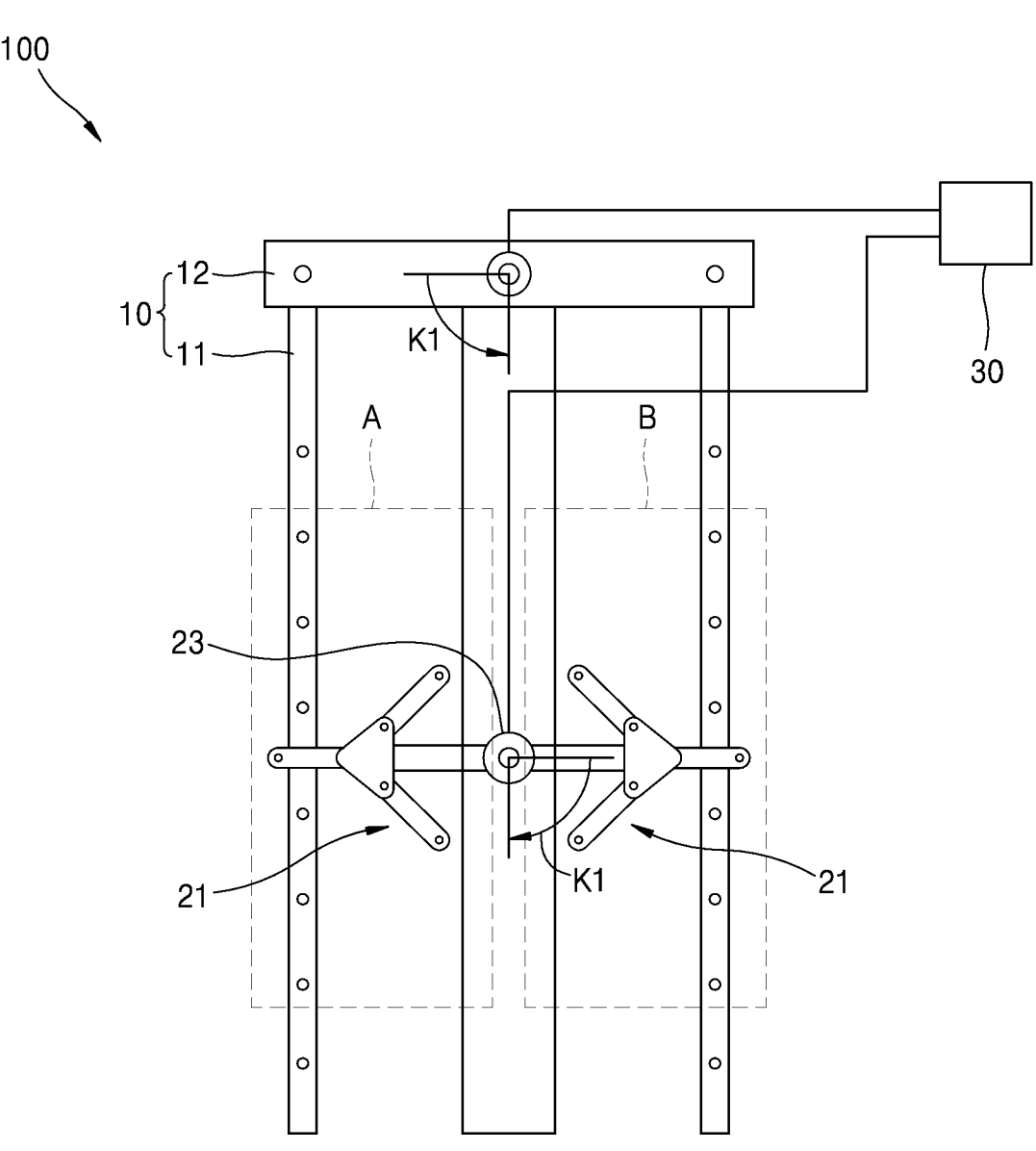
Figure 12:
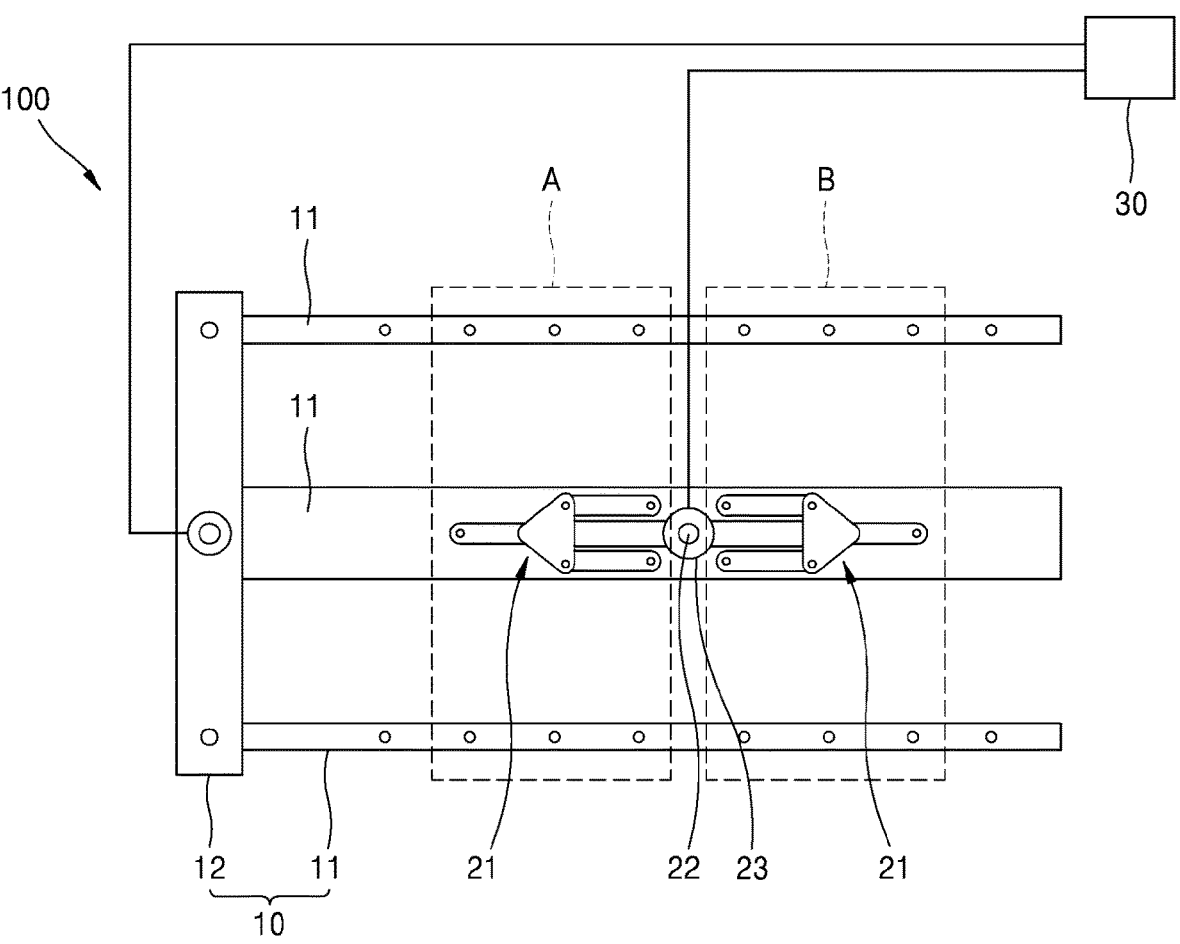

FIGS. 10 to 12 exhibit a process of transferring the substrates 1 delivered from the upstream equipment to the downstream equipment by the substrate transfer system 100 of FIG. 1 by stages.

First, as shown in FIG. 10, for example, the substrates 1 may be loaded in the order of substrate A on the left and substrate B on the right of the robot transportation device 10 from the upstream equipment.

Then, as shown in FIG. 11, when the robot transportation device 10 is in swing motion, the control unit 30 may control a compensatory rotation rate of the compensatory rotation device 20 based on a swing motion rate of the robot transportation device 10 so that a direction of the substrate 1 can be constantly maintained to prevent rotational shock applied to the substrate 1.

Herein, the control unit 30 may be any of different control devices such as a microprocessor, an integrated circuit, a semiconductor chip, a central processing unit, an operational device, a storage device having a program stored therein, a server computer, a personal computer, a smart pad, a smartphone, a smart device, a terminal, etc., which can apply a swing motion control signal to the robot transportation device 10 and apply a compensatory rotation control signal to the compensatory rotation device 20.

As illustrated in FIG. 11, when the robot transportation device 10 is in swing motion, the control unit 30 may enable the compensatory rotation device 20 to reversely rotate the substrate 1 by a first angle K1 if the substrate 1 normally rotates at the first angle K1 by the robot transportation device 10, and thus may constantly maintain the direction of the substrate 1 or the order of the substrates, thereby preventing rotational shock applied to the substrate 1.

Then, the robot transportation device 10 may unload the substrates in the order of substrate A on the left and substrate B on the right of the downstream equipment even when the transport arm 11 is in swing rotation.

Therefore, the robot transportation device 10 may be provided with the compensatory rotation device 20 capable of reversing again the previously reversed substrate 1 so that, even when the substrate 1 is transferred by the robot transportation device 10, a direction of the substrate 1 or the order of the substrates 1 can be maintained; an alternative turning-table device is undesired to thus improve a space utility; the substrate may undergo compensatory rotation while transferring the substrate at the same time, thereby greatly reducing a distribution and transportation time; and a compensatory rotation rate of the compensatory rotation device 20 may be controlled based on a swing motion rate of the robot transportation device 10 to thus constantly maintain the direction of the substrate 1, thereby preventing rotational shock applied to the substrate 1.

Figure 13:
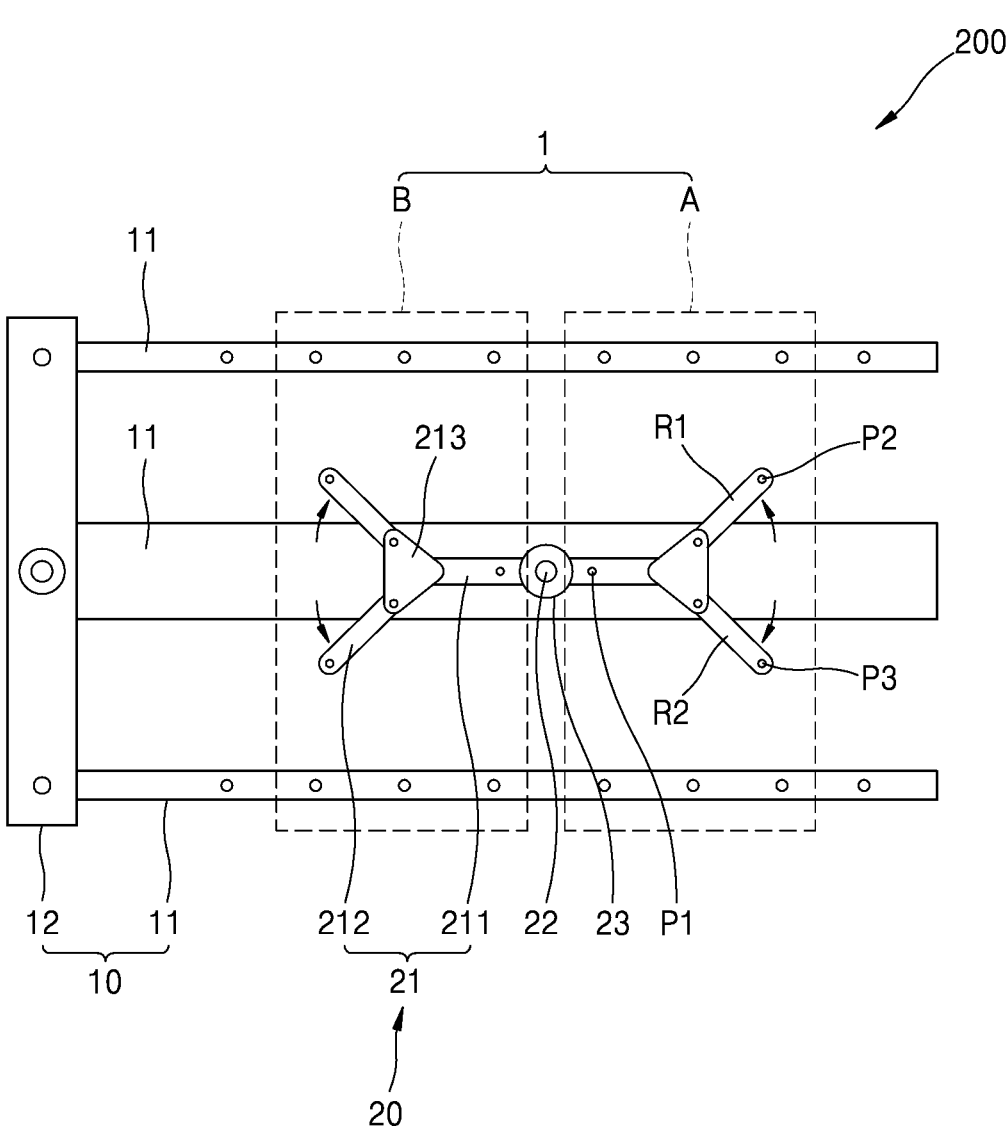
FIG. 13 is a plan view showing a substrate transfer system according to some other embodiments of the present invention.

FIG. 13 is a plan view showing a substrate transfer system 200 according to some other embodiments of the resent invention.

As illustrated in FIG. 13, the first rotating arm R1 and the second rotating arm R2 of the substrate transfer system 200 according to some other embodiments of the present invention may be possibly formed on the outside far away from the center of compensatory rotation, unlike the first rotating arm R1 and the second rotating arm R2 shown in FIG. 12.

In addition, the first rotating arm R1 and the second rotating arm R2 can be formed in very diverse shapes and positions, therefore, are not particularly limited to the drawings.

Figure 14:
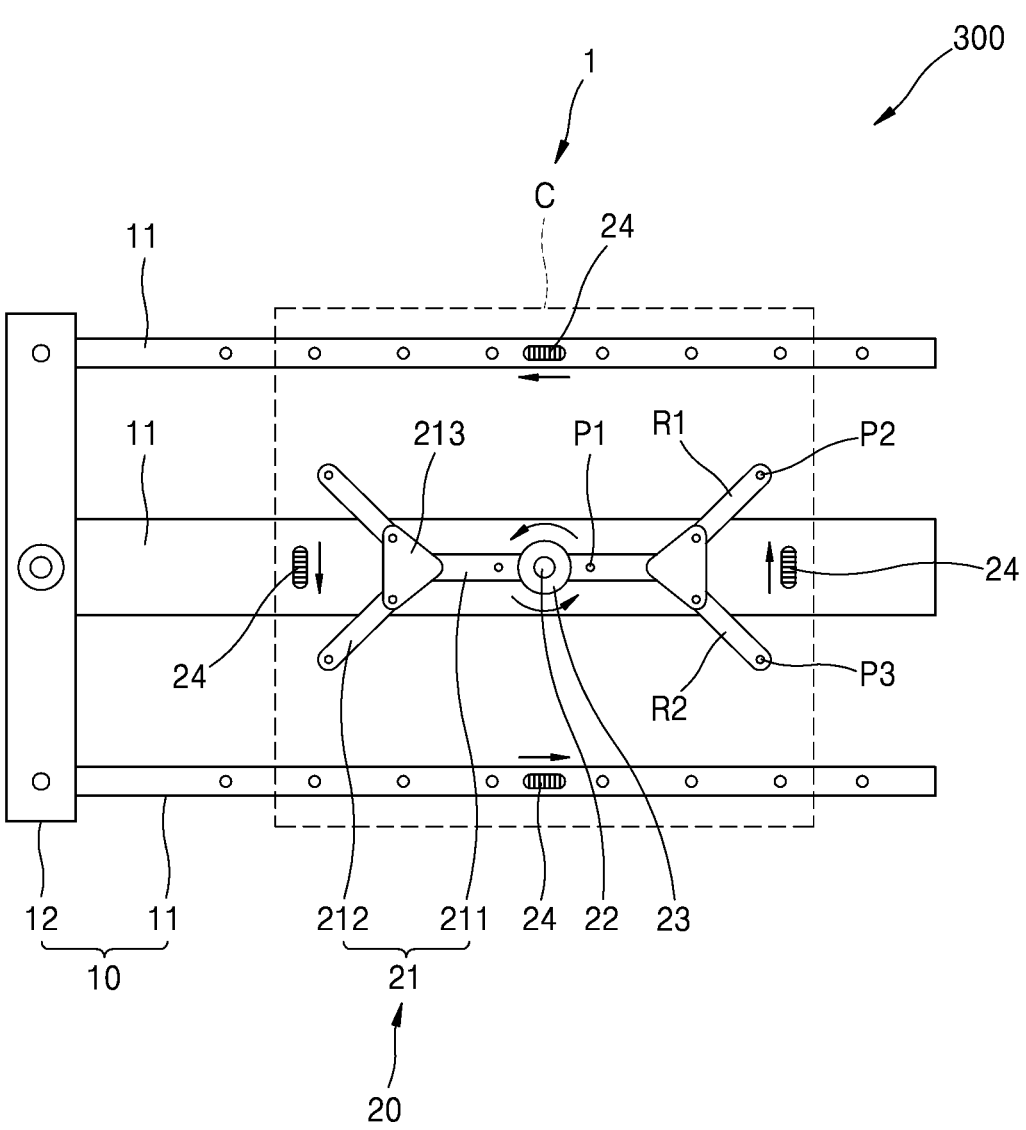
FIG. 14 is a plan view showing a substrate transfer system according to some further embodiments of the present invention.
Figure 15:
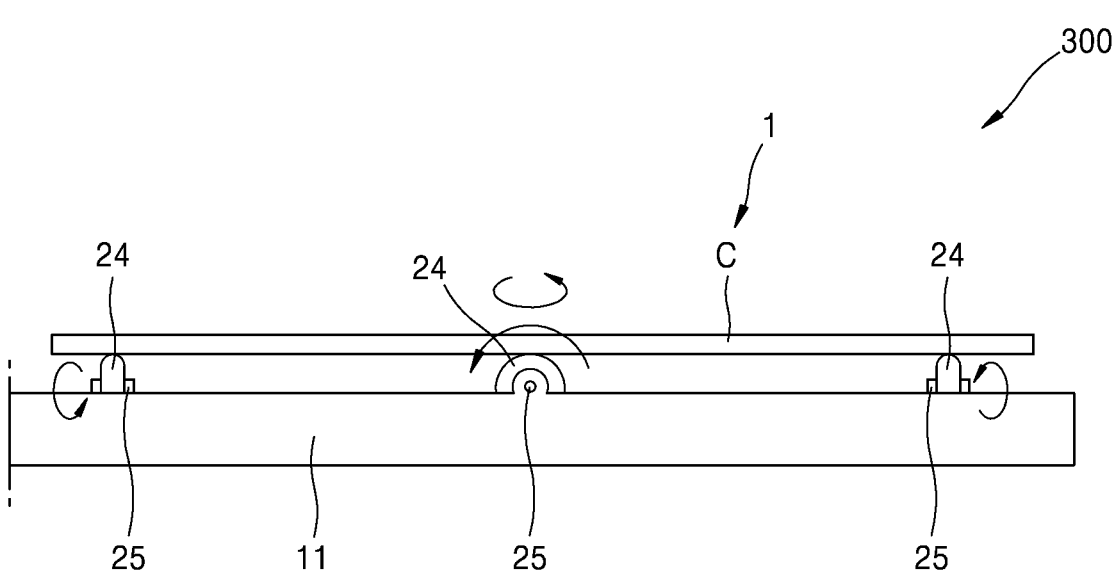
FIG. 15 is a side view showing the substrate transfer system of FIG. 14.

FIG. 14 is a plan view showing a substrate transfer system 300 according to some further embodiments of the present invention, and FIG. 15 is a side view showing the substrate transfer system 300 of FIG. 14.

As illustrated in FIGS. 14 and 15, the substrate transfer system 300 according to some further embodiments of the present invention may further include: as the compensatory rotation device 20, a roll wheel 24 which is mounted on the transport arm 11 of the robot transportation device 10 and is in rolling contact with the bottom surface of the substrate 1; and a wheel rotating device 25 to rotate the roll wheel 24 so that the roll wheel 24 can rotate the substrate 1 in a self-rotational direction of the substrate 1.

Herein, the roll wheel 24 may be provided in plural such as four (4), and these roll wheels may be disposed at an equal angle of 90° based on the center of C substrate 1.

Therefore, it is possible to further easily induce compensatory rotation of the substrate 1 by self-rotation of the C substrate 1 using the roll wheels 24.

Figure 16:
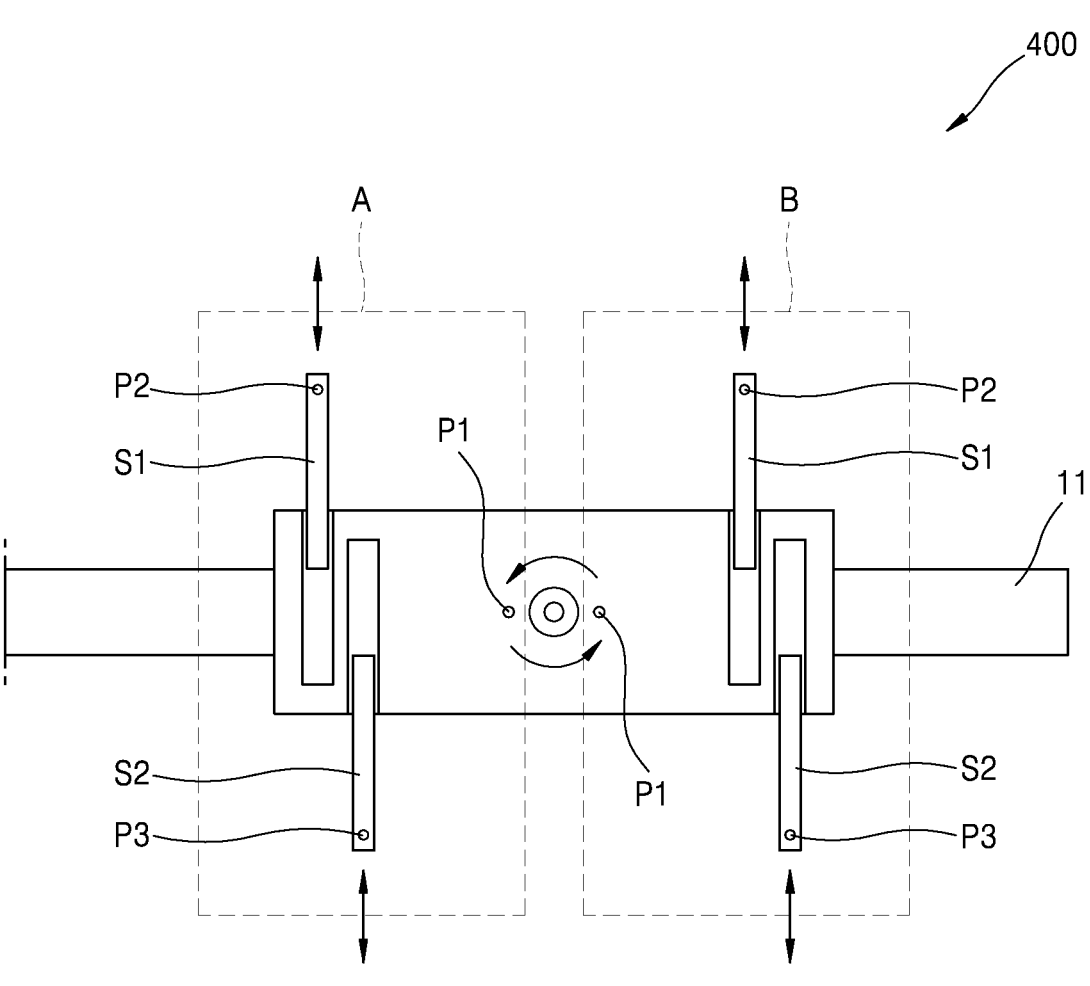
FIG. 16 is a plan view showing a substrate transfer system according to some yet further embodiments of the present invention.

FIG. 16 is a plan view showing a substrate transfer system 400 according to some yet further embodiments of the present invention.

As illustrated in FIG. 16, the substrate transfer system 400 according to some yet further embodiments of the present invention may include a sliding type forward/backward arm S1, S2 as the extending part 212, which is stored in a main body 211 and then protrudes therefrom.

As illustrated in FIG. 16, the sliding type forward/backward arm S1, S2 may include a first forward/backward arm S1 to contract and stretch in one direction based on the main body 211; and a second forward/backward arm S2 to contract and stretch in the other direction based on the main body 211.

Accordingly, when the rotational swing deck 21 is lifted by the swing deck lifting device 22, the first support pin P1, the second support pin P2 and the third support pin P3 may support the substrate 1 at three points or more.

Figure 17:
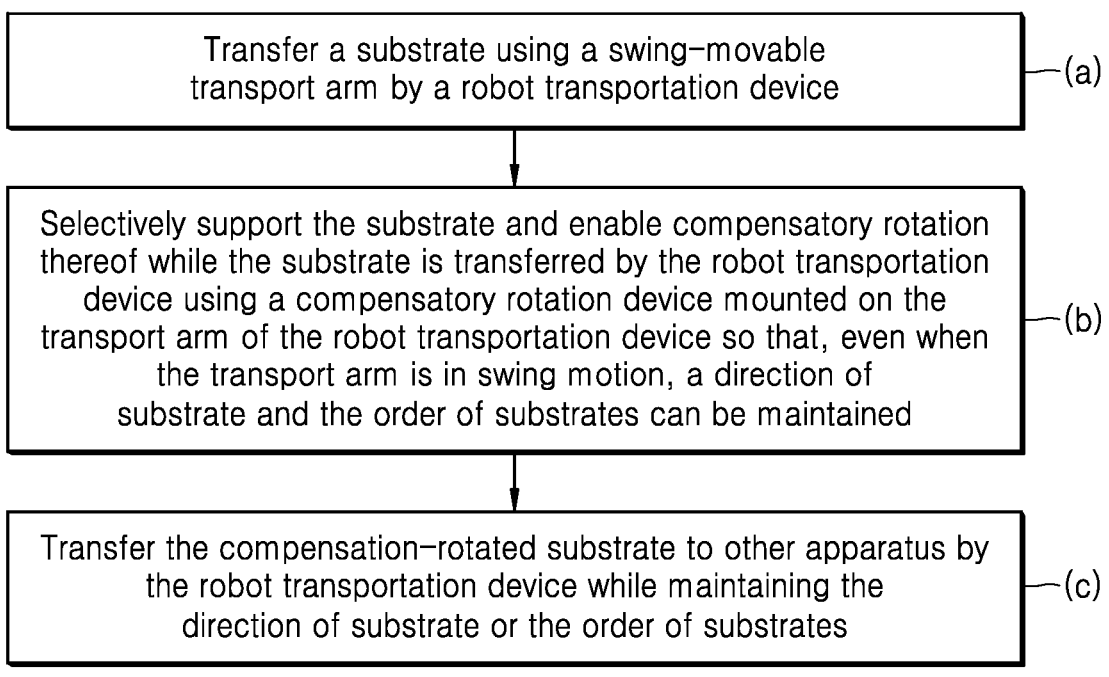
FIG. 17 is a flow chart showing the substrate transfer method according to some embodiments of the present invention.

FIG. 17 is a flow chart exhibiting a substrate transfer method according to some embodiments of the present invention.

As illustrated in FIGS. 1 to 17, the substrate transfer method according to some embodiments of the present invention may include: (a) transferring at least one substrate 1 using at least one swing-movable transport arm 11 by a robot transportation device 10; (b) while the substrate 1 is transferred by the robot transportation device 10, selectively supporting the substrate 1 and enabling compensatory rotation thereof using a compensatory rotation device 20 mounted on the transport arm 11 of the robot transportation device 10 so that, even when the transport arm 11 is in swing motion, a direction of the substrate 1 or the order of the substrates 1 can be maintained; and (c) transferring the compensation-rotated substrate 1 to other apparatus by the robot transportation device 10 while maintaining the direction of the substrate 1 or the order of the substrates 1.

Herein, in the step (b), when the robot transportation device 10 is in swing motion, a compensatory rotation rate of the compensatory rotation device 20 may be controlled based on a swing motion rate of the robot transportation device 10 so that the direction of the substrate 1 can be constantly maintained to thus prevent rotational shock applied to the substrate 1.

Further, for example, in the step (b), when the robot transportation device 10 is in swing motion, the compensatory rotation device 20 may reversely rotate the substrate 1 by a first angle K1 if the substrate 1 normally rotates at the first angle K1 by the robot transportation device 10.

Further, for example, in the step (b), the compensatory rotation device 20 may rotate the roll wheel 24, which is in rolling contact with the bottom surface of the substrate 1, in a self-rotational direction of the substrate 1, thereby enabling compensatory rotation of the substrate 1.

Figure 18:
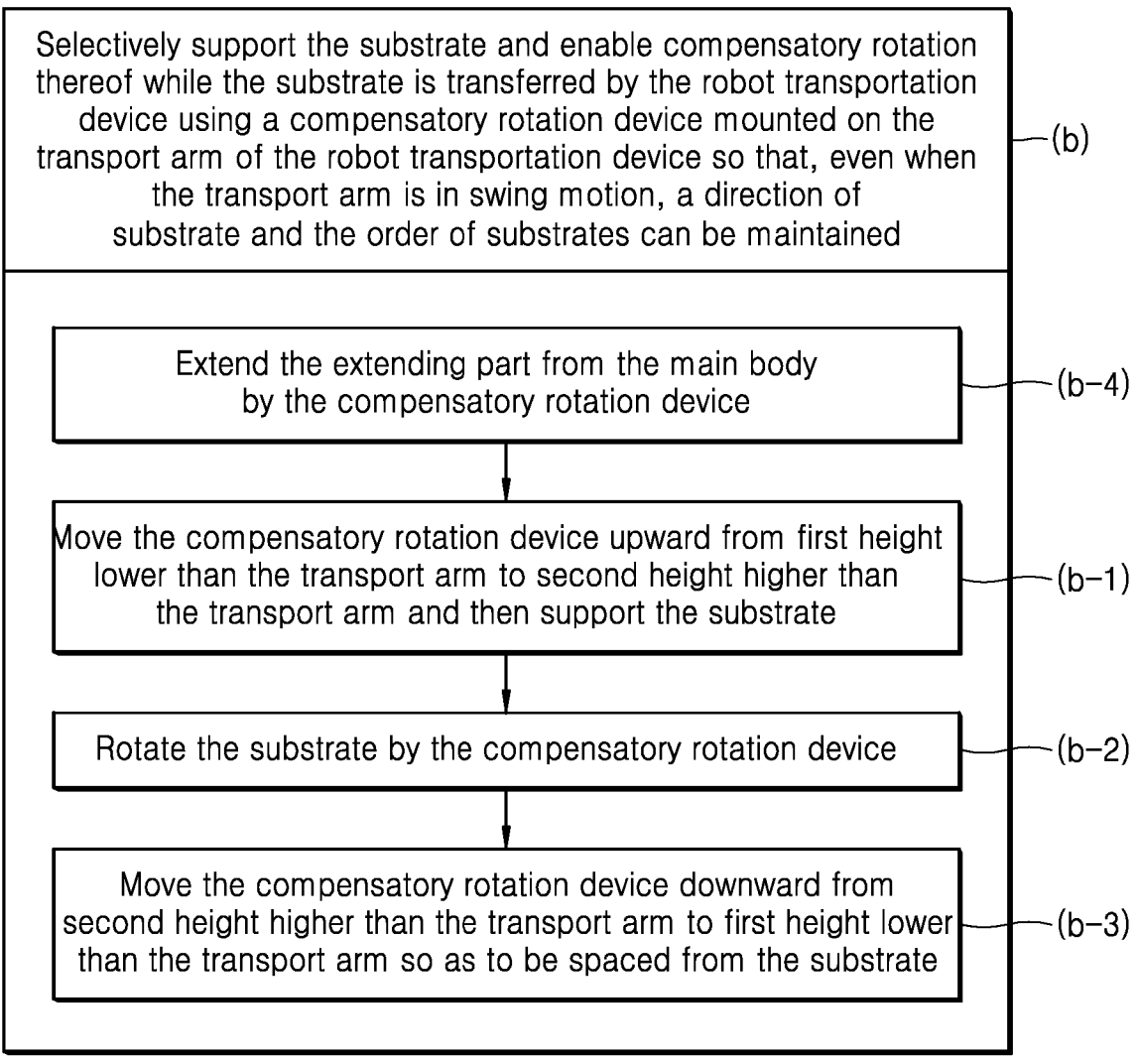
FIG. 18 is a flow chart more specifically showing step (b) of the substrate transfer method of FIG. 17.

FIG. 18 is a flow chart more specifically illustrating the step (b) of the substrate transfer method of FIG. 17.

As illustrated in FIGS. 1 to 18, the step (b) may include: (b-4) extending the extending part 212 from the main body 211 by the compensatory rotation device 20; (b-1) moving the compensatory rotation device 20 upward from a first height H1 lower than the transport arm 11 to a second height higher H2 higher than the transport arm 11 to thus support the substrate 1; (b-2) rotating the substrate 1 by the compensatory rotation device 20; and (b-3) moving the compensatory rotation device 20 downward from the second height H2 higher than the transport arm 11 to the first height H1 lower than the transport arm 11 to thus be spaced from the substrate 1.

Although the present invention has been described with reference to the embodiments shown in the drawings, however, these are merely proposed for illustrative purposes, and those skilled in the art will appreciate that various modifications and other equivalent embodiments are possible. Therefore, the true and technical range of the present invention to be protected would be defined on the basis of technical spirit disclosed in the appended claims.

What is claimed is:

1. A substrate transfer system, comprising:
a robot transportation device that transfers at least one substrate using at least one swing-movable transport arm; and
a compensatory rotation device that is mounted on the at least one swing-movable transport arm of the robot transportation device and is positioned at selectively one of a non-supporting state in which the compensatory rotation device does not contact the at least one substrate and a supporting state in which the compensatory rotation device contacts the at least one substrate,
wherein in the supporting state, the compensatory rotation device supports the at least one substrate to thus enable compensatory rotation thereof so that, even when the at least one swing-movable transport arm has a swing motion while the at least one substrate is transferred by the robot transportation device, a direction of the at least one substrate or an order of the at least one substrate is maintained.

2. The system according to claim 1,
wherein the compensatory rotation device includes:
a rotational swing deck that supports the at least one substrate and is rotatably mounted in the supporting state;
a swing deck lifting device that moves up and down the rotational swing deck such that the swing deck lifting device places the rotational swing deck at a first height lower than the at least one swing-movable transport arm in the non-supporting state, and places the rotational swing deck at a second height higher than the at least one swing-movable transport arm in the supporting state; and
a swing deck rotating device that rotates the rotational swing deck lifted to the second height.

3. The system according to claim 2,
wherein the rotational swing deck includes:
a main body connected to the swing deck lifting device or the swing deck rotating device;
an extending part installed to be extendable from the main body; and
an extension device to extend the extending part.

4. The system according to claim 3,
wherein the extending part is a foldable rotary arm to be folded to and unfolded from the main body.

5. The system according to claim 4,
wherein the foldable rotary arm includes:
a first rotating arm to be unfolded in a first direction based on the main body; and
a second rotating arm to be unfolded in a second direction, opposite to the first direction, based on the main body.

6. The system according to claim 5,
wherein a first support pin is formed on the main body to support the at least one substrate at three points or more;
a second support pin is formed on the first rotating arm; and
a third support pin is formed on the second rotating arm.

7. The system according to claim 1, further comprising:
a control unit that applies a swing motion control signal to the robot transportation device and a compensatory rotation control signal to the compensatory rotation device,
wherein, when the robot transportation device is in the swing motion, the control unit controls a compensatory rotation rate of the compensatory rotation device based on a swing motion rate of the robot transportation device so as to constantly maintain the direction of the at least one substrate, thereby preventing rotational shock applied to the at least one substrate.

8. The system according to claim 7,
wherein, when the robot transportation device is in the swing motion, the control unit enables the compensatory rotation device to reversely rotate the at least one substrate by a first angle if the at least one substrate normally rotates at the first angle by the robot transportation device.

9. The system according to claim 1,
wherein the compensatory rotation device includes:
a roll wheel which is mounted on the at least one swing-movable transport arm of the robot transportation device, and is in rolling contact with a bottom surface of the at least one substrate; and a wheel rotating device which rotates the roll wheel such that the roll wheel can rotate the at least one substrate in a self-rotational direction of the at least one substrate.

10. The system according to claim 9,
wherein at least three or more roll wheels are arranged at equal angles based on a center of the at least one substrate.

11. The system according to claim 3,
wherein the extending part is a sliding type forward/backward arm that is stored in and then protrudes from the main body.

12. The system according to claim 11,
wherein the sliding type forward/backward arm includes:
a first forward/backward arm to contract and stretch in a first direction based on the main body; and
a second forward/backward arm to contact and stretch in a second direction, opposite to the first direction, based on the main body.

13. A substrate transfer method, comprising:
(a) transferring at least one substrate using at least one swing-movable transport arm by a robot transportation device; and
(b) during a time when the at least one substrate is transferred by the robot transportation device, selectively positioning a compensatory rotation device in one of a non-supporting state in which the compensatory rotation device does not contact the at least one substrate and a supporting state in which the compensatory rotation device contacts the at least one substrate, wherein in the supporting state, the compensatory rotation device supports the at least one substrate and enables compensatory rotation thereof so that, even when the at least one swing-movable transport arm is in a swing motion, a direction of the at least one substrate or an order of the at least one substrates is maintained.

14. The method according to claim 13, wherein the step (b) includes:
(b-1) moving the compensatory rotation device upward from a first height lower than the at least one swing-movable transport arm to a second height higher than the at least one swing-movable transport arm to thus support the at least one substrate;
(b-2) rotating the at least one substrate by the compensatory rotation device; and
(b-3) moving the compensatory rotation device downward from the second height higher than the at least one swing-movable transport arm to the first height lower than the at least one swing-movable transport arm to thus be spaced from the at least one substrate.

15. The method according to claim 14,
wherein, before the step (b-1), the step (b) further includes
(b-4) extending an extending part from a main body by the compensatory rotation device.

16. The method according to claim 13,
wherein, in the step (b),
when the robot transportation device is in the swing motion, a compensatory rotation rate of the compensatory rotation device is controlled based on a swing motion rate of the robot transportation device so as to maintain the direction of the at least one substrate, thereby preventing rotational shock applied to the at least one substrate.

17. The method according to claim 16,
wherein, in the step (b),
when the robot transportation device is in the swing motion, the compensatory rotation device reversely rotates the at least one substrate by a first angle if the at least one substrate normally rotates at the first angle by the robot transportation device.

18. The method according to claim 13,
wherein, in the step (b),
the compensatory rotation device rotates a roll wheel in rolling contact with a bottom surface of the at least one substrate to a self-rotational direction of the at least one substrate, thereby enabling compensatory rotation of the at least one substrate.

19. The method according to claim 13, further comprising:
(c) transferring the compensation-rotated substrate to other apparatus by the robot transportation device while maintaining the direction of the at least one substrate or an order of the at least one substrates.

20. A substrate transfer system, comprising:
a robot transportation device that transfers at least one substrate using at least one swing-movable transport arm;
a compensatory rotation device that is mounted on the at least one swing-movable transport arm of the robot transportation device, and selectively supports the at least one substrate and enables compensatory rotation thereof so that, even when the at least one swing-movable transport arm is in a swing motion while the at least one substrate is transferred by the robot transportation device, a direction of the at least one substrate or an order of the at least one substrate is maintained; and
a control unit that applies a swing motion control signal to the robot transportation device and also a compensatory rotation control signal to the compensatory rotation device,
wherein the compensatory rotation device includes:
a rotational swing deck that supports the at least one substrate and is rotatably mounted;
a swing deck lifting device that moves up and down the rotational swing deck from a first height lower than the at least one swing-movable transport arm to a second height higher than the at least one swing-movable transport arm;
a swing deck rotating device that rotates the rotational swing deck lifted to the second height;
a roll wheel that is mounted on the at least one swing-movable transport arm of the robot transportation device and is in rolling contact with a bottom surface of the at least one substrate; and
a wheel rotating device that rotates the roll wheel so that the roll wheel can rotate the at least one substrate in a self-rotational direction of the at least one substrate,
wherein the rotational swing deck includes:
a main body connected to the swing deck lifting device or the swing deck rotating device;
an extending part mounted to be extendable from the main body; and
an extension device to extend the extending part,
wherein the extending part is a foldable rotary arm to be folded to and then unfolded from the main body,
wherein the foldable rotary arm includes:
a first rotating arm that is unfolded in a first direction based on the main body; and a second rotating arm that is unfolded to a second direction, opposite to the first direction, based on the main body, wherein a first support pin is formed on the main body, a second support pin is formed on the first rotating arm, a third support pin is formed on the second rotating arm, so as to support the at least one substrate at three points or more, and wherein the control unit controls a compensatory rotation rate of the compensatory rotation device based on a swing motion rate of the robot transportation device so that, when the robot transportation device is in the swing motion, the direction of the at least one substrate is constantly maintained to thus prevent rotational shock applied to the at least one substrate.

\* \* \* \* \*